United States Patent
Lee

(10) Patent No.: US 9,594,203 B2
(45) Date of Patent: Mar. 14, 2017

(54) OPTICAL MEMBER, DISPLAY DEVICE HAVING THE SAME AND METHOD FOR FABRICATING THE SAME

(75) Inventor: Sun Hwa Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 125 days.

(21) Appl. No.: 14/232,825

(22) PCT Filed: Jun. 26, 2012

(86) PCT No.: PCT/KR2012/005046
§ 371 (c)(1),
(2), (4) Date: Jan. 14, 2014

(87) PCT Pub. No.: WO2013/009016
PCT Pub. Date: Jan. 17, 2013

(65) Prior Publication Data
US 2014/0153280 A1    Jun. 5, 2014

(30) Foreign Application Priority Data
Jul. 14, 2011    (KR) .................... 10-2011-0069805

(51) Int. Cl.
*F21V 7/04* (2006.01)
*F21V 8/00* (2006.01)
(Continued)

(52) U.S. Cl.
CPC ............. *G02B 6/0035* (2013.01); *F21V 9/08* (2013.01); *G02B 5/23* (2013.01); *G02B 6/005* (2013.01);
(Continued)

(58) Field of Classification Search
CPC .... G02B 6/005; G02B 6/0035; G02B 6/0065; G02B 5/23; F21V 9/08; G02F 1/133617; G02F 2202/28; G02F 2001/133614
(Continued)

(56) References Cited

U.S. PATENT DOCUMENTS 5,141,989 A * 8/1992 Jung et al. .................... 524/561
2005/0225857 A1   10/2005 Inagaki
(Continued)

FOREIGN PATENT DOCUMENTS

CN    1300606 C    2/2007
CN    101942196 A    1/2011
(Continued)

OTHER PUBLICATIONS

Choi et al. "Polymers for flexible displays: From material selection to device applications" Progress in Polymer Science Feb. 4, 2008 vol. 33 pp. 581-630.*
(Continued)

*Primary Examiner* — Ali Alavi
(74) *Attorney, Agent, or Firm* — Saliwanchik, Lloyd & Eisenschenk

(57) ABSTRACT

Disclosed are an optical member, a display device including the same, and a method of fabricating the same. The optical member includes a barrier film; an adhesive layer bonded onto the barrier film and including a plurality of wavelength conversion particles and an adhesive; and a detachable film detachably attached onto the adhesive layer.

7 Claims, 5 Drawing Sheets

(51) Int. Cl.
*G02B 5/23* (2006.01)
*G02F 1/1335* (2006.01)
*F21V 9/08* (2006.01)

(52) U.S. Cl.
CPC ..... *G02B 6/0065* (2013.01); *G02F 1/133617* (2013.01); *G02F 2202/28* (2013.01)

(58) Field of Classification Search
USPC .................................. 362/606, 84, 618, 317
See application file for complete search history.

(56) References Cited

U.S. PATENT DOCUMENTS

| | | | |
|---|---|---|---|
| 2006/0103589 A1* | 5/2006 | Chua et al. ............... | 345/3.1 |
| 2007/0004065 A1* | 1/2007 | Schardt et al. ............ | 438/26 |
| 2009/0194774 A1* | 8/2009 | Huang et al. ............. | 257/88 |
| 2010/0238381 A1 | 9/2010 | Oshima et al. | |
| 2011/0090670 A1* | 4/2011 | Ahn et al. ................ | 362/84 |
| 2011/0186811 A1* | 8/2011 | Coe-Sullivan et al. ..... | 257/13 |
| 2012/0187367 A1 | 7/2012 | Modi et al. | |

FOREIGN PATENT DOCUMENTS

| | | |
|---|---|---|
| TW | 200613259 | 5/2006 |
| TW | I276231 B | 3/2007 |
| TW | 2009-35142 A | 8/2009 |
| TW | 201040588 A | 11/2010 |
| WO | WO-2009-137053 A1 | 11/2009 |
| WO | WO-2010/129350 A2 | 11/2010 |

OTHER PUBLICATIONS

Office Action dated Sep. 26, 2014 in Taiwanese Application No. 101125337.
Myeon-Cheon Choi, et al. Polymers for flexible displays: From material selection to device applications. Progress in Polymer Science. Feb. 4, 2008. vol. 33. 581-630.
International Search Report dated Jan. 16, 2013, in International Application No. PCT/KR2012/005046, filed Jun. 26, 2012.
European Search Report in European Application No. 12811033 filed May 21, 2014.
Office Action dated Jun. 1, 2016 in Taiwanese Application No. 10520684490.

* cited by examiner ively used.

OPTICAL MEMBER, DISPLAY DEVICE HAVING THE SAME AND METHOD FOR FABRICATING THE SAME

CROSS-REFERENCE TO RELATED APPLICATIONS

This application is the U.S. national stage application of International Patent Application No. PCT/KR2012/005046, filed Jun. 26, 2012, which claims priority to Korean Application No. 10-2011-0069805, filed Jul. 14, 2011, the disclosures of each of which are incorporated herein by reference in their entirety.

TECHNICAL FIELD

The embodiment relates to an optical member, a display device having the same, and a method for fabricating the same.

BACKGROUND ART

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device, which is capable of displaying various images using the white light supplied to the light guide plate through the quantum dot bar as the blue light is emitted from the blue LED, has been extensively used.

A display device employing such a quantum dot is disclosed in Korean Unexamined Patent Publication No. 10-2011-006810.

DISCLOSURE OF INVENTION

Technical Problem

The embodiment provides an optical member, which can be readily used and has the superior reliability, a display device having the same and a method for fabricating the same.

Solution to Problem

An optical member according to the embodiment includes a barrier film; an adhesive layer bonded onto the barrier film and including a plurality of wavelength conversion particles and an adhesive; and a detachable film detachably attached onto the adhesive layer.

A display device according to the embodiment includes a light source; a wavelength conversion part for converting a wavelength of light emitted from the light source; and a display panel into which the light output from the wavelength conversion part is incident, wherein the wavelength conversion part includes a barrier film; and an adhesive layer bonded onto the barrier film and including a plurality of wavelength conversion particles.

A method of fabricating an optical member according to the embodiment includes the steps of preparing an adhesive composition including a plurality of wavelength conversion particles; coating the adhesive composition on a barrier film to form a preliminary adhesive layer; forming an adhesive layer by curing the preliminary adhesive layer; and laminating a detachable film on the adhesive layer.

Advantageous Effects of Invention

The optical member according to the embodiment includes the adhesive layer and the detachable film. Thus, the optical member according to the embodiment can be readily bonded to various members through the adhesive layer after removing the detachable film.

In particular, the optical member according to the embodiment can be readily used as an external decorative material. In addition, the optical member according to the embodiment can be readily stored in the form of a roll in a state that the detachable film is included therein.

Further, the optical member according to the embodiment can be applied to the light guide plate, the display panel and the optical sheet to convert the wavelength of the incident light. At this time, the wavelength conversion particles can be protected from external moisture and/or hydrogen by the barrier film.

Therefore, the optical member according to the embodiment may have the superior reliability and durability.

MODE FOR THE INVENTION

Figure 1:
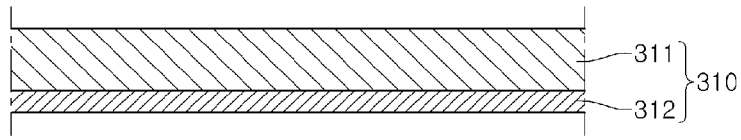
FIGS. 1 to 3 are sectional views showing the procedure for fabricating a wavelength conversion tape according to the embodiment.

In the description of the embodiments, it will be understood that when a substrate, a frame, a sheet, a layer or a pattern is referred to as being "on" or "under" another substrate, another frame, another sheet, another layer, or another pattern, it can be "directly" or "indirectly" on the other substrate, frame, sheet, layer, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
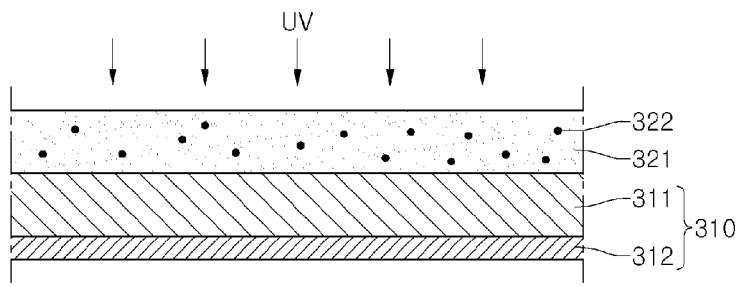
Figure 3:
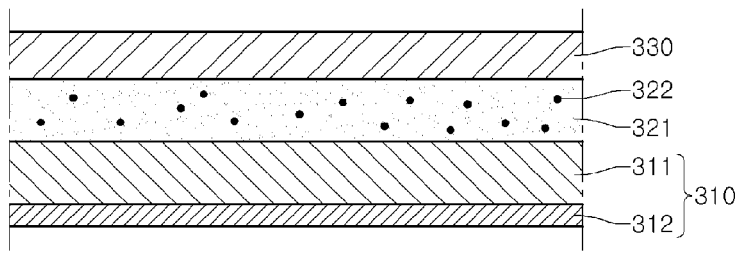
Figure 4:
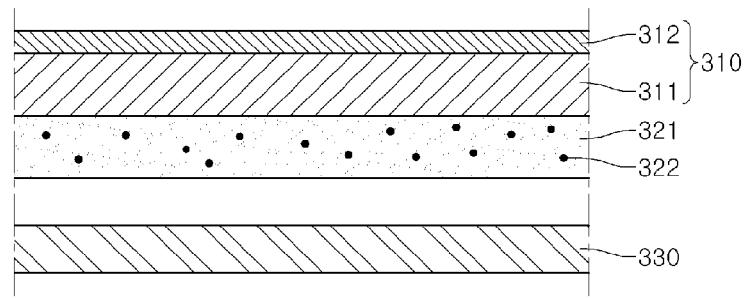
FIGS. 4 and 5 are sectional views showing the procedure for bonding a wavelength conversion tape according to the embodiment to other members.
Figure 5:
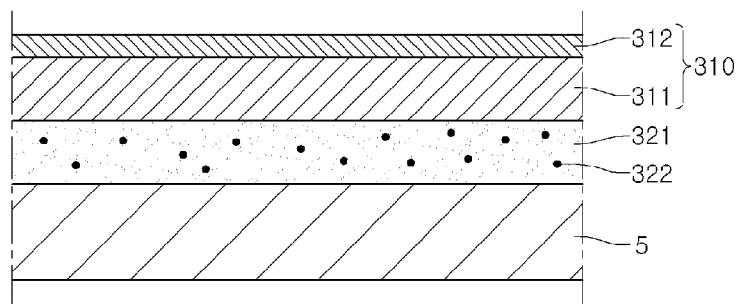

FIGS. 1 to 3 are sectional views showing the procedure for fabricating a wavelength conversion tape according to the embodiment. FIGS. 4 and 5 are sectional views showing the procedure for bonding the wavelength conversion tape according to the embodiment to other members.

The wavelength conversion tape according to the embodiment can be fabricated through the following process.

Referring to FIG. 1, a barrier film 310 is provided.

The barrier film 310 is transparent. The barrier film 310 may have the low oxygen permeability and moisture permeability. The barrier film 310 extends in one direction. The barrier film 310 can be supplied while being wound around a roll. The barrier film 310 may include a transparent polymer layer 311 and an inorganic layer 312.

The polymer layer 311 includes polymer. For instance, the polymer layer 311 may include polyethyleneterephthalate (PET). The polymer layer 311 may be flexible.

The inorganic layer 312 is coated on the polymer layer 311. In detail, the inorganic layer 312 is coated on an entire area of a top surface and/or a bottom surface of the polymer layer 311. The inorganic layer 312 can be formed through various processes, such as the sputtering process, the chemical vapor deposition process or the evaporation process.

The inorganic layer 312 may be formed by using a material, such as silicon oxide ($Si_XO_Y$), silicon carbide oxide ($Si_XC_YO_Z$), silicon oxide nitride ($Si_XO_YN_Z$), or aluminum oxide ($Al_XO_Y$).

Referring to FIG. 2, an adhesive layer 321 is formed on the barrier layer 310.

First, in order to form the adhesive layer 321, an adhesive composition including a plurality of wavelength conversion particles 322 is prepared.

The adhesive composition may include acryl copolymer, rubber copolymer or silicon copolymer. The acryl copolymer, rubber copolymer or silicon copolymer, which is the main component of the adhesive composition, may be contained at the ratio of about 40 wt % to about 90 wt % based on the total adhesive composition.

The acryl copolymer generally includes those obtained by copolymerizing at least 40 wt % of one or two of $C_2$-$C_{14}$ alkyl acrylates and $C_2$-$C_{14}$ alkyl methacrylates as a main monomer with the balance of a functional monomer, such as unsaturated carboxylic acid, copolymerizable with the acrylates, or a modifying monomer, such as styrene, vinyl acetate or acrylonitrile, and such acrylic polymers may be used alone or in combination as desired.

The rubber copolymer may include one selected from the group consisting of natural rubber, styrene-isoprene-styrene block copolymer, styrene-butadiene-styrene block copolymer, styrene-ethylene-butadiene-styrene block copolymer, and a mixture including at least one or two of the above copolymers.

The silicon copolymer may include polydimethylsiloxane, polyorganosiloxane or a modified mixture thereof. In general, silicon oil is a main component of the silicon copolymer and desired silicon resin can be added as a release modifier.

In addition, the adhesive composition may further include a crosslinking agent, such as ethylene glycol monobutyl ether acetate, hydrogenated rosin ester, or vinyl acetate. The crosslinking agent may be added at the ratio of about 1 wt % to about 5 wt % based on the total adhesive composition.

The adhesive composition may further include alcohol, such as propane-2-ol as a solvent. The solvent may be added at the ratio of about 10 wt % to about 29 wt % based on the total adhesive composition.

In addition, the adhesive composition may include various additives, such as dispersing agents.

In detail, the adhesive composition may include acrylate acetate copolymer, ethylene glycol monobutyl ether acetate, hydrogenated rosin ester, vinyl acetate and propanol.

At this time, the acrylate acetate copolymer can be contained at the ratio of about 40 wt % to about 90 wt %, the ethylene glycol monobutyl ether acetate can be contained at the ratio of about 1 wt % to about 10 wt %, the hydrogenated rosin ester can be contained at the ratio of about 1 wt % to about 10 wt %, the vinyl acetate can be contained at the ratio of about 1 wt % to about 5 wt %, and the propanol can be contained at the ratio of about 8 wt % to about 40 wt % in the adhesive composition.

Then, the wavelength conversion particles 322 are uniformly dispersed in the adhesive composition. The wavelength conversion particles 322 may include quantum dots, which will be described later in detail.

Thereafter, the adhesive composition may be coated on the barrier film 310 through the spray coating, the spin coating, or the slot coating process. Thus, a preliminary adhesive layer including the adhesive composition is formed on the barrier film 310.

Then, the preliminary adhesive layer formed on the barrier film 310 is cured by ultraviolet ray and/or heat so that the adhesive layer 321 is formed on the barrier film 310.

The adhesive layer 321 may include a silicon adhesive, a rubber adhesive or an acryl adhesive. That is, if the silicon copolymer is mainly added to the adhesive composition, the silicon adhesive is mainly included in the adhesive layer 321. In addition, if the rubber copolymer is mainly added to the adhesive composition, the rubber adhesive is mainly included in the adhesive layer 321. Further, if the acryl copolymer is mainly added to the adhesive composition, the acryl adhesive is mainly included in the adhesive layer 321. At this time, viscosity of the adhesive contained in the adhesive layer 321 may be about 5,000 cP to about 20,000 cP.

Referring to FIG. 3, a detachable film 330 is laminated on the adhesive layer 321. The detachable film 330 may include transparent polymer, such as ethylene terephthalate. The detachable film 330 may be surface-treated such that the detachable film 330 can be readily detached.

As a result, a wavelength conversion film 301 according to the embodiment is obtained. The wavelength conversion film 301 can be used as follows.

Referring to FIG. 4, the detachable film 330 is detached from the adhesive layer 321. Thus, the adhesive layer 321 is exposed to the outside.

Referring to FIG. 5, the exposed adhesive layer 321 may be bonded to the other member 5. The other member 7 may be an external decorative member for an electronic appliance. In addition, the other member 5 may be a component of the display device. That is, the wavelength conversion film 301 according to the embodiment may be an optical member applied to the component of the display device.

As described above, the wavelength conversion tape 301 according to the embodiment can be readily bonded to various members through the adhesive layer 321 after removing the detachable film 330.

In particular, the wavelength conversion tape 301 according to the embodiment can be effectively used as an external decorative member. In addition, the optical member according to the embodiment can be readily stored in the form of a roll in a state that the detachable film 330 is included therein.

Further, the wavelength conversion tape 301 according to the embodiment can effectively protect the wavelength conversion particles 322 from external moisture and/or hydrogen by using the barrier film 310. Therefore, the wavelength conversion tape 301 according to the embodiment may have the superior reliability and durability.

Figure 6:
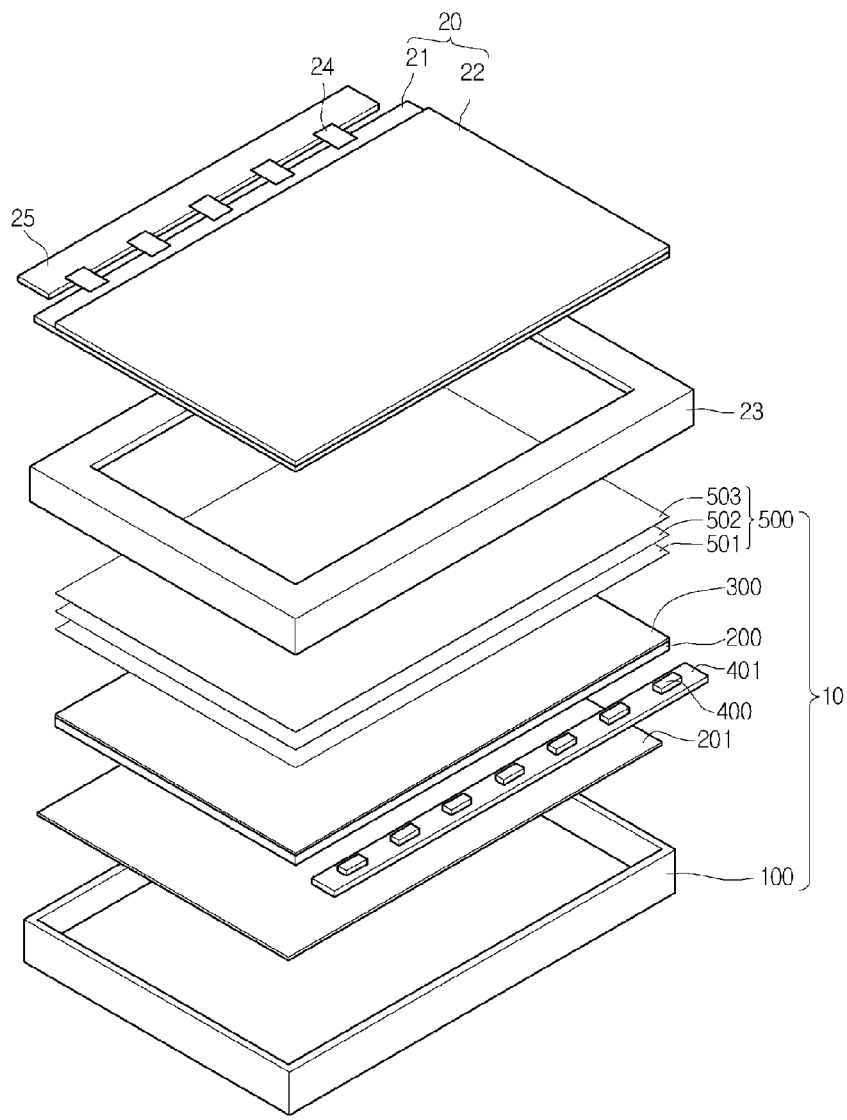
FIG. 6 is an exploded perspective view showing a liquid crystal display according to the first embodiment.
Figure 7:
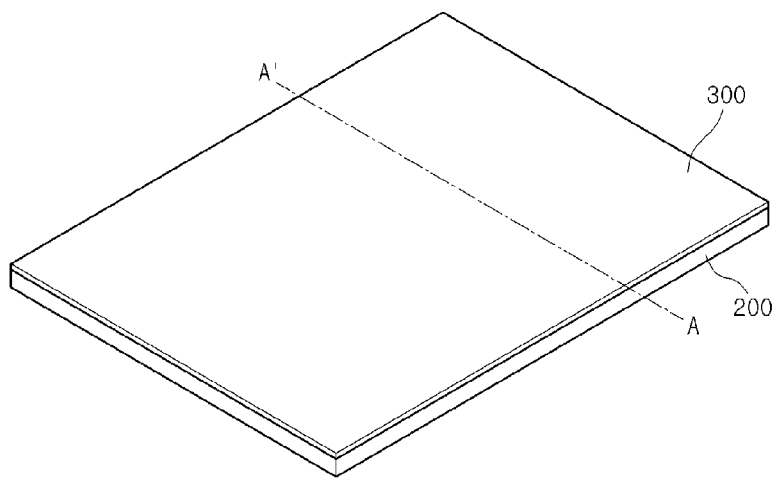
FIG. 7 is a perspective view showing a wavelength conversion part and a light guide plate according to the first embodiment.
Figure 8:
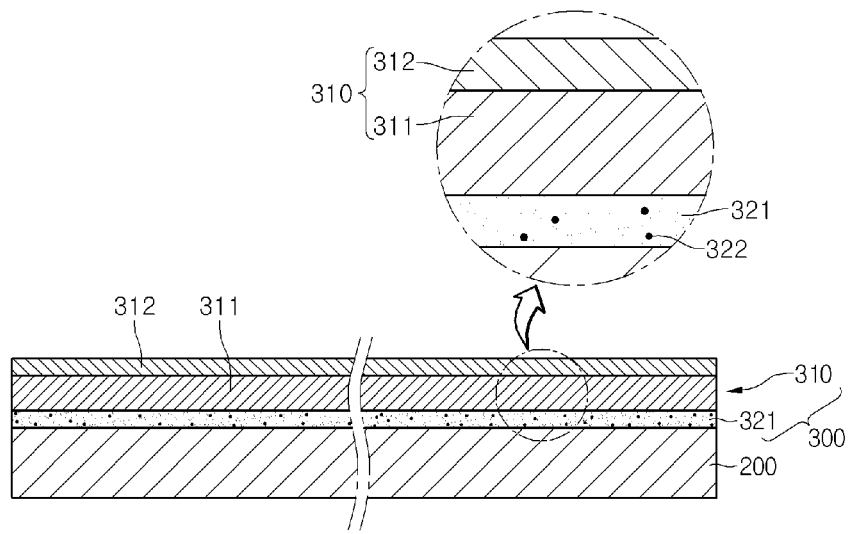
FIG. 8 is a sectional view taken along line A-A' of FIG. 7.

FIG. 6 is an exploded perspective view showing a liquid crystal display according to the first embodiment, FIG. 7 is a perspective view showing a wavelength conversion part and a light guide plate according to the first embodiment, and FIG. 8 is a sectional view taken along line A-A' of FIG. 7. In the description about the present embodiment, the description about the wavelength conversion tape will be incorporated by reference except for the modified parts.

Referring to FIGS. 6 to 8, the liquid crystal display (LCD) according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 201, a wavelength conversion part 300, a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 201, and the optical sheets 500 therein.

The light guide plate 200 is disposed in the bottom cover 100 and arranged on the reflective sheet 201. The light guide plate 200 guides the light upward by totally-reflecting, refracting and scattering the light incident thereto from the light emitting diodes 400.

The reflective sheet 201 is disposed below the light guide plate 200. In more detail, the reflective sheet 201 is disposed between the light guide plate 200 and the bottom surface of the bottom cover 100. The reflective sheet 201 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 may emit the blue light having the wavelength band of about 430 nm to about 470 nm or the UV light having the wavelength band of about 300 nm to abut 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The wavelength conversion part 300 converts the wavelength of the light emitted from the light emitting diodes. The wavelength conversion part 300 outputs the light in the upward direction by converting the wavelength of the incident light.

For instance, if the light emitting diodes 400 are blue light emitting diodes, the wavelength conversion part 300 converts the blue light output upward from the light guide plate 200 into the green light and the red light. In detail, the wavelength conversion part 300 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the wavelength conversion part 300 converts the UV light output upward from the light guide plate 200 into the blue light, the green light and the red light. In detail, the wavelength conversion part 300 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion part 300 and the lights converted by the wavelength conversion part 300. In detail, the white light can be incident into the liquid crystal panel 20 through the combination of the blue light, the green light and the red right.

That is, the wavelength conversion part 300 is a wavelength conversion member that converts the wavelength of the incident light. In other words, the wavelength conversion part 300 is an optical member to change the characteristic of the incident light.

The wavelength conversion part 300 is disposed on the light guide plate 200. In detail, the wavelength conversion part 300 is disposed between the light guide plate 200 and the liquid crystal panel 20. In more detail, the wavelength conversion part 300 is bonded to the top surface of the light guide plate.

As shown in FIGS. 7 and 8, the wavelength conversion part 300 includes the adhesive layer 321, a plurality of wavelength conversion particles 322 and the barrier film 310.

The adhesive layer 321 surrounds the wavelength conversion particles 322. That is, the wavelength conversion particles 322 are uniformly distributed in the adhesive layer 321. The adhesive layer 321 is transparent. The adhesive layer 321 includes an adhesive. The adhesive layer 321 can be bonded to the top surface of the light guide plate 200.

The wavelength conversion particles 322 are distributed in the adhesive layer 321. In detail, the wavelength conversion particles 322 are uniformly distributed in the adhesive layer 321.

The wavelength conversion particles 322 convert the wavelength of the light emitted from the light emitting diodes 400. In detail, the wavelength conversion particles 322 receive light emitted from the light emitting diodes 400 to convert the wavelength of the incident light. For instance, the wavelength conversion particles 322 may convert the blue light emitted from the light emitting diodes 400 into the green light and the red light. That is, a part of the wavelength conversion particles 322 may convert the blue light into the green light having the wavelength in the range of about 520 nm to about 560 nm and a part of the wavelength conversion particles 322 may convert the blue light into the red light having the wavelength in the range of about 630 nm to about 660 nm.

In addition, the wavelength conversion particles 322 may convert the UV light emitted from the light emitting diodes 400 into the blue light, the green light and the red light. That is, a part of the wavelength conversion particles 322 may convert the UV light into the blue light having the wavelength in the range of about 430 nm to about 470 nm, a part of the wavelength conversion particles 322 may convert the UV light into the green light having the wavelength in the range of about 520 nm to about 560 nm and a part of the wavelength conversion particles 322 may convert the UV light into the red light having the wavelength in the range of about 630 nm to about 660 nm.

That is, if the light emitting diodes are blue light emitting diodes that emit the blue light, the wavelength conversion particles 322 capable of converting the blue light into the green light and the red light can be employed. In addition, if the light emitting diodes are UV light emitting diodes that emit the UV light, the wavelength conversion particles 322 capable of converting the UV light into the blue light, the green light and the red light can be employed.

The wavelength conversion particles 322 may be prepared as quantum dots (QD). The quantum dots may include core nano-crystals and shell nano-crystals surrounding the core nano-crystals. In addition, the quantum dots may include organic ligands bonded to the shell nano-crystals. Further, the quantum dots may include an organic coating layer surrounding the shell nano-crystals.

The shell nano-crystals may be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dots and the molar ratio between the molecular cluster compound and the nano-particle precursor during the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, the one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general pigment and has the superior quantum yield as compared with the general pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

Referring again to FIG. 7, the optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 may include a diffusion sheet 501, a first prism sheet 502, and a second prism sheet 503.

The diffusion sheet 501 is disposed on the wavelength conversion part 300. The diffusion sheet 501 may improve the uniformity of light passing through the diffusion sheet 501. The diffusion sheet 501 may include a plurality of beads.

The first prism sheet 502 is provided on the diffusion sheet 501. The second prism sheet 503 is provided on the first prism sheet 502. The first prism sheet 502 and the second prism sheet 503 may improve the linearity of light passing therethrough.

The liquid crystal panel 20 is disposed on the optical sheets 500. In addition, the liquid crystal panel 20 is disposed on the panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Hereinafter, the TFT substrate 21 and the color filter substrate 22 will be described in detail although it is not shown in the drawings in detail. The TFT substrate 21 includes a plurality of gate lines and a plurality of data lines crossing the gate lines to define pixels and a thin film transistor (TFT) is provided at each cross section such that the thin film transistor TFT can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the liquid crystal panel 20 to supply driving signals to the gate lines and data lines.

The driving PCB 25 is electrically connected to the liquid crystal panel 20 by a COF (chip on film) 24. The COF 24 may be replaced with a TCP (tape carrier package).

As described above, the wavelength conversion part 300 can be bonded to the optical sheets 500. The wavelength conversion part 300 can be bonded to at least one lateral side of the optical sheets 500.

Figure 9:
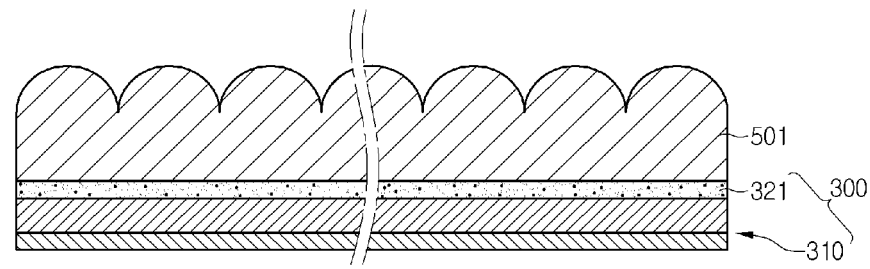
FIG. 9 is a sectional view showing a wavelength conversion part and a diffusion sheet according to the second embodiment.

Referring to FIG. 9, the wavelength conversion part 300 can be bonded to one surface of the diffusion sheet 501. For instance, the wavelength conversion part 300 can be bonded to the bottom surface of the diffusion sheet 501.

Figure 10:
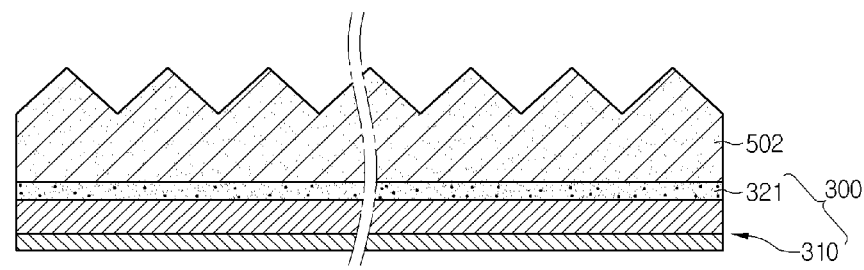
FIG. 10 is a sectional view showing a wavelength conversion part and a diffusion sheet according to the third embodiment.

Referring to FIG. 10, the wavelength conversion part 300 can be bonded to one surface of the first prism sheet 502. For instance, the wavelength conversion part 300 can be bonded to the bottom surface of the first prism sheet 502. In the same way, the wavelength conversion part 300 can be bonded to the bottom surface of the second prism sheet 503.

As described above, the wavelength conversion part 300 can be readily bonded to various optical members, such as the light guide plate 200 and the optical sheets 500.

In addition, the barrier film 310 covers the adhesive layer 321 to protect the wavelength conversion particles 322 from the external moisture and/or oxygen.

Therefore, the liquid crystal display according to the embodiment may have the superior reliability and durability.

Figure 11:
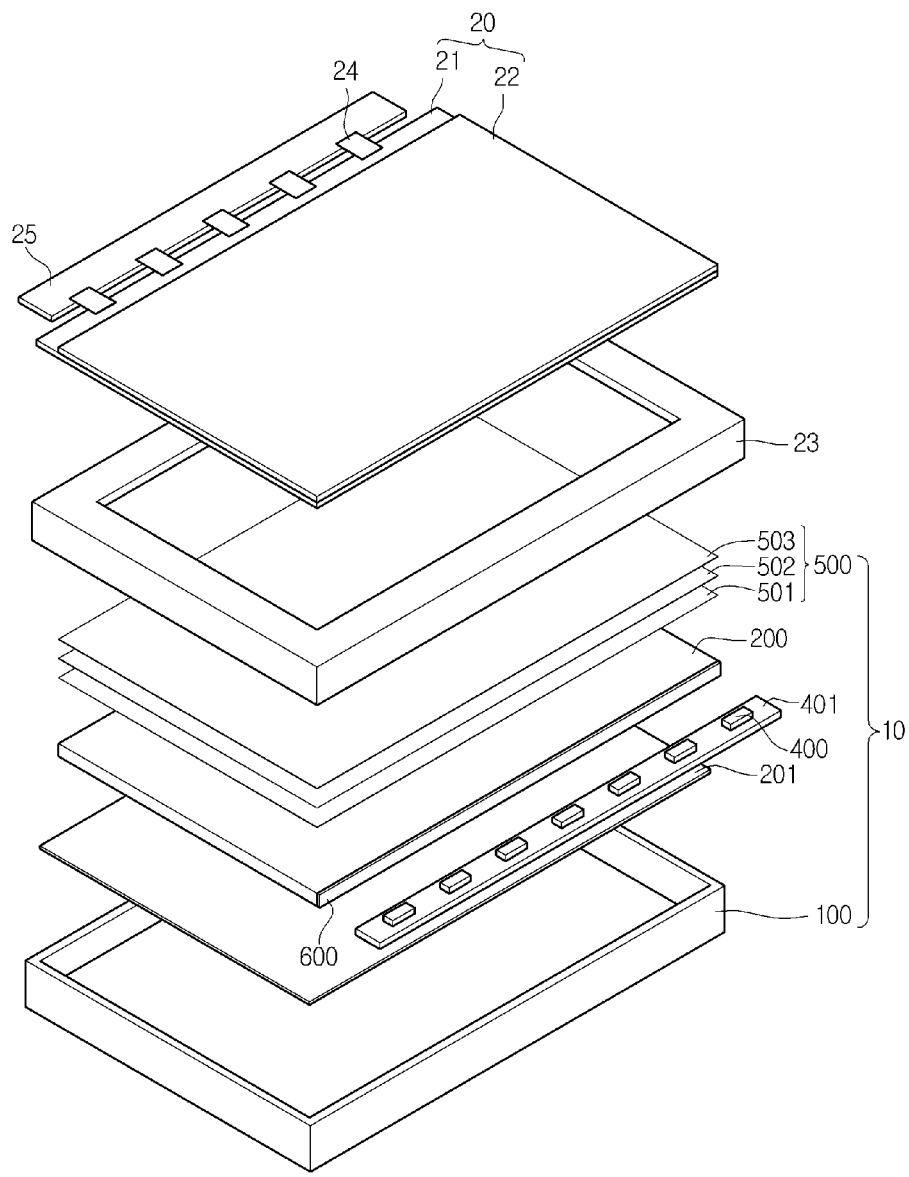
FIG. 11 is an exploded perspective view showing a liquid crystal display according to the fourth embodiment.
Figure 12:
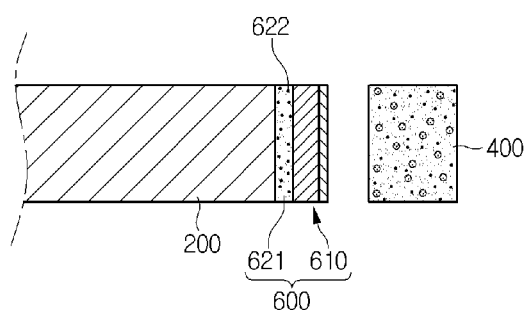
FIG. 12 is a sectional view showing parts of a light guide plate, a light emitting diode and a wavelength conversion part.
Figure 13:
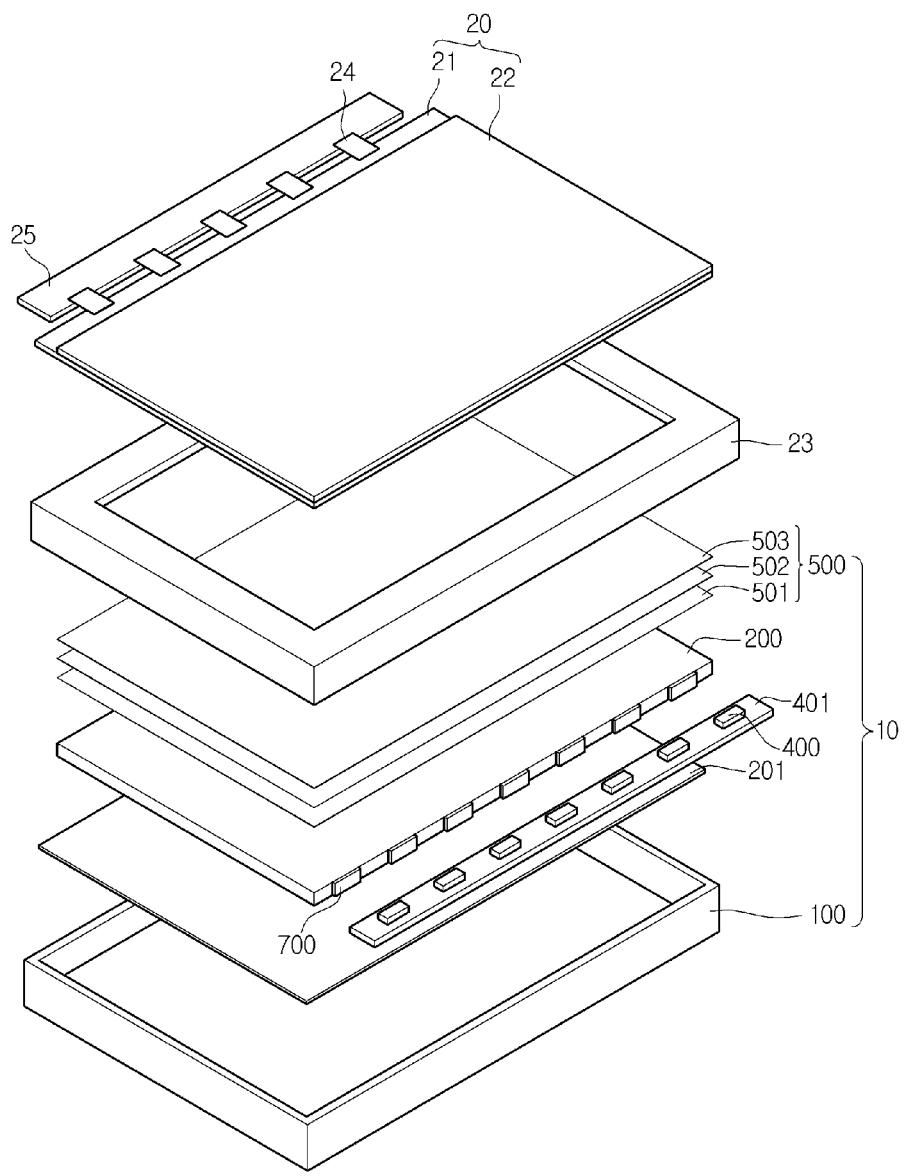
FIG. 13 is an exploded perspective view showing a liquid crystal display according to the fifth embodiment.

FIG. 11 is an exploded perspective view showing a liquid crystal display according to the fifth embodiment, FIG. 12 is a sectional view showing parts of a light guide plate, a light emitting diode and a wavelength conversion part and FIG. 13 is an exploded perspective view showing a liquid crystal display according to the fifth embodiment. In the description about the present embodiments, the description about the liquid crystal display according to the previous embodiments will be incorporated by reference except for the modified parts.

Referring to FIGS. 11 and 12, the wavelength conversion part 600 is disposed at the lateral side of the light guide plate 200. In detail, the wavelength conversion part 600 is disposed on an incident surface of the light guide plate 200. In more detail, the wavelength conversion part 600 is disposed between the light guide plate 200 and the light emitting diodes 400.

In addition, as shown in FIG. 12, the wavelength conversion part 600 can be bonded to the incident surface of the light guide plate 200. That is, the wavelength conversion part 600 may adhere to the incident surface of the light guide plate 200.

As shown in FIGS. 11 and 12, the wavelength conversion part 600 includes an adhesive layer 621, a plurality of wavelength conversion particles 622 and a barrier film 610.

The wavelength conversion part 600 may extend in one direction. In detail, the wavelength conversion part 600 may extend along one lateral side of the light guide plate 200. In more detail, the wavelength conversion part 600 may extend along an incident surface of the light guide plate 200.

The wavelength conversion part 600 receives light emitted from the light emitting diodes 400 to convert the wavelength of the incident light. For instance, the wavelength conversion part 600 may convert the blue light emitted from the light emitting diodes 400 into the green light and the red light. That is, the wavelength conversion part 600 may convert a part of the blue light into the green light having the wavelength in the range of about 520 nm to about 560 nm and convert a part of the blue light into the red light having the wavelength in the range of about 630 nm to about 660 nm.

In addition, the wavelength conversion part 600 can convert the UV light emitted from the light emitting diodes 400 into the blue light, the green light and the red light. In detail, the wavelength conversion part 300 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion part 600 and the lights converted by the wavelength conversion part 600. In detail, the white light can be incident into the liquid guide plate 200 through the combination of the blue light, the green light and the red right.

Referring to FIG. 13, the wavelength conversion part 700 may be disposed in the region corresponding to the light emitting diodes 400. That is, the wavelength conversion part 700 may not be disposed over the entire area of the incident surface. In other words, the wavelength conversion part 700 may partially expose the incident surface. The wavelength conversion part 700 may be disposed only in the region into which the light is mainly incident. That is, the wavelength conversion part 700 may be disposed at the lateral side of the light guide plate 200 in the form of dots.

In the liquid crystal display according to the present embodiments, the wavelength conversion parts 600 and 700 have a relatively small size. Thus, a smaller amount of first and second wavelength conversion particles 322 can be used to fabricate the liquid crystal display according to the present embodiment.

Therefore, the liquid crystal display according to the present embodiment can reduce the amount of the first and second wavelength conversion particles 322 and can be readily fabricated at the low cost.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:
a light source;
a wavelength conversion part that converts a wavelength of light emitted from the light source;
a display panel into which the light output from the wavelength conversion part is incident; and
a light guide plate under the display panel;
wherein the wavelength conversion part comprises:
a barrier film; and
an adhesive layer bonded onto the barrier film and including a plurality of wavelength conversion particles,
wherein the wavelength conversion particles are distributed in the adhesive layer,
wherein the adhesive layer is in direct contact with the barrier film;
wherein the light emitted from the light source is incident into the light guide plate through a lateral side of the light guide plate, and the wavelength conversion part is bonded to the lateral side of the light guide plate; and
wherein the wavelength conversion part is disposed in a region of the light guide plate corresponding to the light source.

2. The display device of claim 1, wherein the barrier film includes a transparent polymer layer and an inorganic layer coated on the transparent polymer layer.

3. The display device of claim 2, wherein the inorganic layer includes silicon oxide ($Si_xO_Y$), silicon carbide oxide ($Si_xC_YO_Z$), silicon oxide nitride ($Si_xO_YN_Z$), or aluminum oxide ($Al_xO_Y$).

4. The display device of claim 1, wherein the adhesive layer has viscosity in a range of about 5,000 cP to about 20,000 cP.

5. The display device of claim 1, wherein the adhesive layer includes a silicon adhesive, a rubber adhesive or an acryl adhesive.

6. The display device of claim 1, wherein the wavelength conversion part is disposed only in a region into which the light is incident.

7. The display device of claim 1, wherein the wavelength conversion part in a form of dots is disposed on the lateral side of the light guide plate.

* * * * *